United States Patent
Brauer

[19]

[11] Patent Number: 5,940,998
[45] Date of Patent: Aug. 24, 1999

[54] ILLUMINATING APPARATUS FOR USE WITH MEDICAL DIAGNOSTIC IMAGING FILM

[76] Inventor: William R. Brauer, 2420 N. Pasadena Blvd., Wauwatosa, Wis. 53226

[21] Appl. No.: 09/041,009

[22] Filed: Mar. 12, 1998

Related U.S. Application Data

[62] Division of application No. 08/709,416, Sep. 6, 1996, abandoned.

[51] Int. Cl.⁶ .................................................. G02B 27/02
[52] U.S. Cl. .......................... 40/361; 362/307; 362/347; 40/564
[58] Field of Search .............................. 40/361, 362, 366, 40/367, 547, 564, 582; 362/307, 308, 329, 347, 350; 359/641

[56] References Cited

U.S. PATENT DOCUMENTS

| | | | |
|---|---|---|---|
| 1,803,631 | 5/1931 | Mabee | 40/361 |
| 2,336,016 | 12/1943 | Jayne et al. | 40/564 |
| 2,500,318 | 3/1950 | Michaelis | 40/564 X |
| 4,081,665 | 3/1978 | Corbeil | 40/574 X |
| 4,088,881 | 5/1978 | Neer et al. | 40/574 X |
| 4,580,197 | 4/1986 | Lum | 362/85 |
| 5,056,912 | 10/1991 | Hamada et al. | 353/38 |
| 5,438,485 | 8/1995 | Li et al. | 362/32 |
| 5,497,270 | 3/1996 | Rud | 359/629 |
| 5,613,768 | 3/1997 | Kim | 362/298 |
| 5,808,803 | 9/1998 | Ullmann et al. | 359/641 |

*Primary Examiner*—Brian K. Green
*Attorney, Agent, or Firm*—Skarsten Law Offices S.C.

[57] ABSTRACT

Apparatus is provided for illuminating medical diagnostic imaging film with significantly enhanced contrast and resolution. The apparatus includes an enclosure having a first end and a second end in opposing relationship therewith, and a concave mirror or the like located in the enclosure proximate to the first end and receiving light from a light source such as a light pipe. The mirror projects at least a portion of the received light, in the form of a collimated beam, toward the second end of the enclosure. The apparatus further includes a light transmissive panel positioned across the second end of the enclosure to support the film in the path of the collimated beam, for illumination thereby. In one embodiment, the film support panel is selectively curved to minimize reduction in field of view.

8 Claims, 5 Drawing Sheets

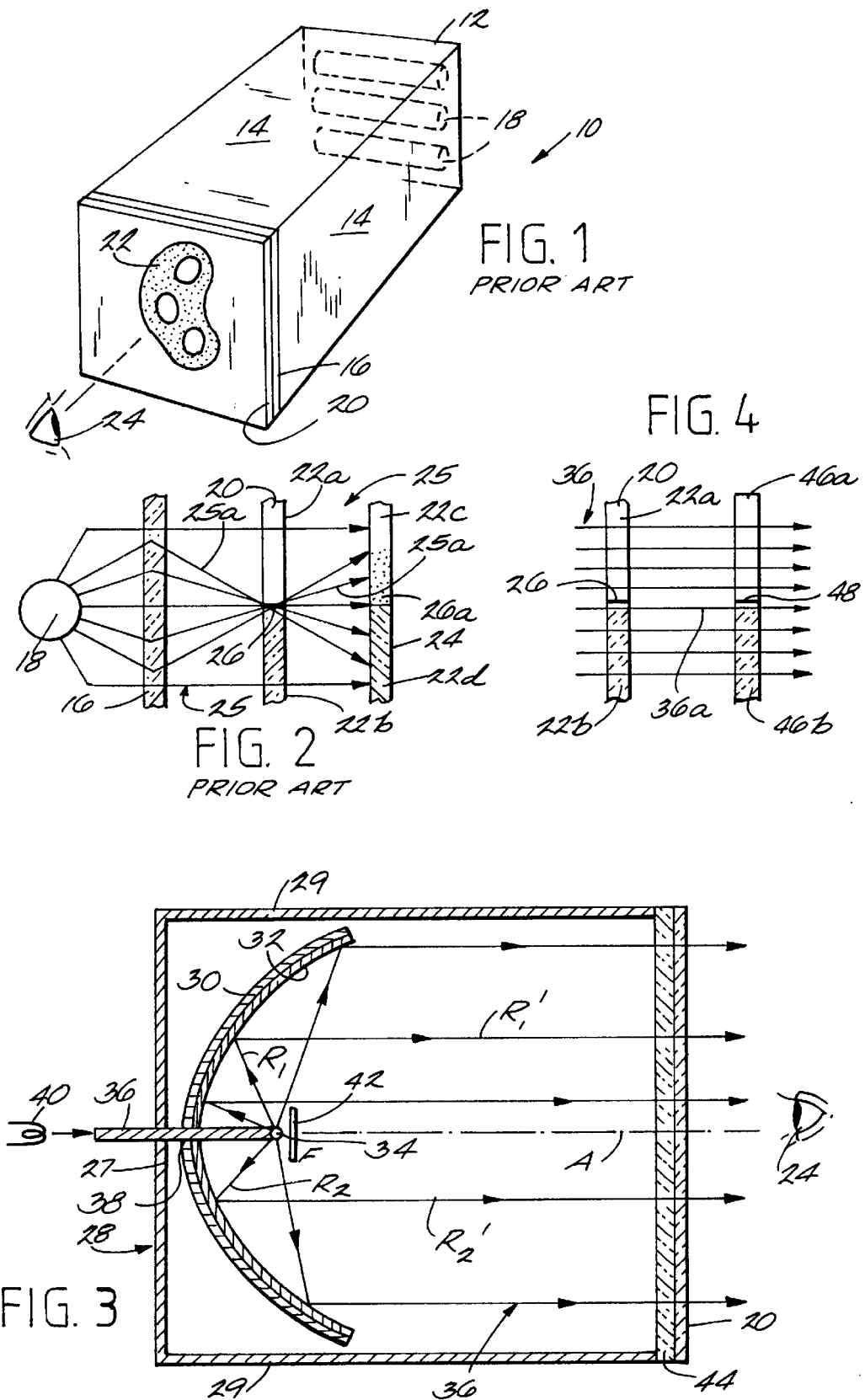

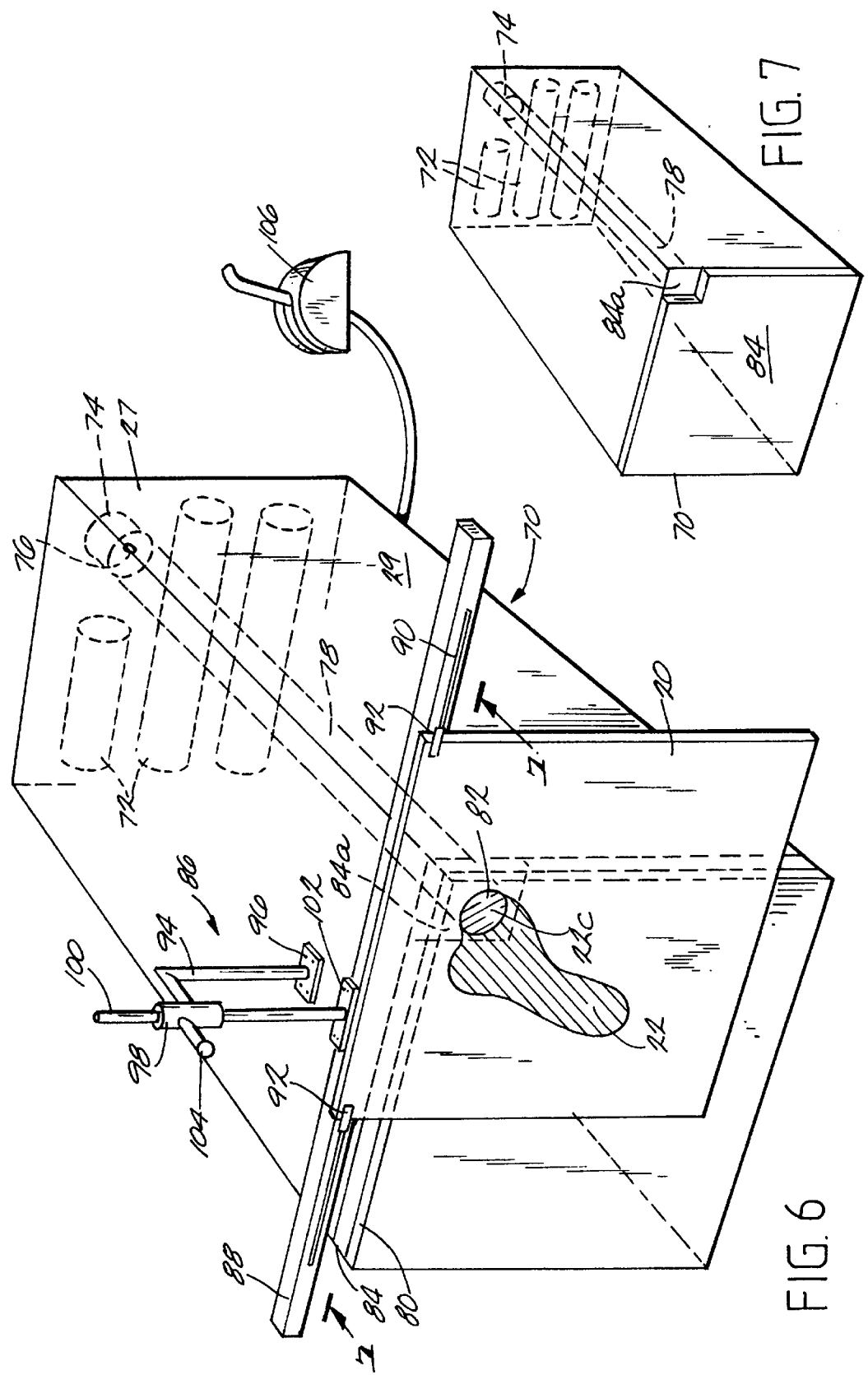

ILLUMINATING APPARATUS FOR USE WITH MEDICAL DIAGNOSTIC IMAGING FILM

This application is a continuation division of application No. 08/709,416, filed Sep. 6, 1996, now abandoned.

BACKGROUND OF THE INVENTION

The invention disclosed and claimed herein generally pertains to improved apparatus for illuminating film, containing a radiographic or other medical diagnostic image, for viewing and study. More particularly, the invention pertains to apparatus of such type for generating light which illuminates the film with significantly enhanced contrast and resolution, or sharpness, whereby viewability is improved.

View boxes and bright lights are well-known types of devices used by radiologists to view and study radiographic images and other medical diagnostic images which are on film. Such images, showing selected views of body tissue, can be obtained by means of conventional X-ray, computed tomography (CT), magnetic resonance imaging (MRI), and other techniques known to those of skill in the medical diagnostic imaging arts. By carefully studying such images, a radiologist can detect the presence of significant medical conditions in a patient or other subject, without the need for invasive surgery. Some important examples of such conditions include breast cancer, lung cancer, pneumonia, fracture, and arthritis.

Conventional view boxes generally are used to view medical diagnostic film, which typically are on the order of 14 inches by 17 inches. Such a device contains one or more fluorescent tubes or other sources of light, and has a front panel typically comprising a translucent light diffuser, such as a sheet of milky white Plexiglas. Also, the dimensions of the front panel may be large enough to accommodate four films, placed side by side, at the same time. Each radiographic imaging film is placed on the light diffuser and transilluminated, for viewing and study, by light from the light source. The light passes through the diffuser and is diffused or scattered thereby. Thus, the light transmitted to the imaging film is of uniform brightness or intensity, so that the imaging film is uniformly illuminated.

If a view box was not provided with a diffuser or other means for scattering light from the fluorescent tube light source, the fluorescent tubes would tend to be seen through the imaging film, interfering with the study thereof. However, the scattering or diffusing of illuminating light causes contrast between lighter and darker regions on the imaging film, as well as resolution, to be degraded from the perspective of an observer. More particularly, because the light which carries the film image to a viewer's eye is diffused, edges or boundaries between lighter and darker regions of the image are blurred, as received on the retina of the viewer. Thus, the radiologist's task of correctly interpreting a film image is made more difficult. Certain conditions, such as breast cancer, lung nodules and small pneumothorax (collapsed lung) are especially hard to detect in any event. If there is too much blurring of edges, or insufficient contrast between lighter and darker areas of a film image, a correct diagnosis of such conditions may not even be possible. The term "resolution," as used herein, means the level of sharpness or blurring which characterizes the boundary, or edge, between adjacent lighter and darker regions of an image.

The importance of providing a high level of contrasted resolution, in illuminating a diagnostic imaging film, is further emphasized by certain regulations of the U.S. government. Under federal law, all X-ray equipment used in the United States for mammography, that is, for acquiring radiographic images for detecting breast cancer, must be periodically tested for contrast and resolution. Such test is conducted by producing a radiographic image of a standardized mammography phantom, which is analyzed by a federal inspector or medical personnel. If the inspector determines that contrast or resolution of the image is insufficient, the facility at which the equipment is located will not be allowed to perform further mammography until the situation is corrected. Such federal standards have been put into place because, if there is insufficient contrast between two adjacent areas of slightly different density in a breast, or insufficient resolution along the edge therebetween, a subtle breast cancer (characterized by an only slightly different density from surrounding normal breast tissue) will not be detectable. This, in turn, may result in a delay of treatment, which could cause great harm to a patient.

In the past, it has been suggested that contrast of a medical diagnostic imaging film, illuminated by means of a view box, could be improved by substantially increasing the spatial separation between the light source and the imaging film. Thus, the light illuminating the film would become less diffused. However, the proposed spatial separation was on the order of six to twelve feet, whereas the depth of a conventional view box is generally less than one foot. It would be highly impractical for a number of reasons, including cost and spatial constraints, to construct a view box having the proposed expanded dimensions.

A bright light is a conventional device for illuminating a small portion of a medical diagnostic film with light of substantially greater intensity than is provided by a view box. Thus, if a radiologist is unsure about the meaning of a portion of a film while studying it on a view box, he can transfer the film to the bright light, and position the film relative thereto, so that the higher intensity light of the bright light will illuminate the unclear film portion. A bright light is particularly useful for studying dark portions of film. Bright lights of the prior art generally comprise a single incandescent bulb of 80–100 watts, and are not provided with a separate diffuser. The light bulb used is generally frosted to provide sufficient diffusion. However, the design of prior art bright lights likewise has generally been unconcerned with providing improved levels of resolution and contrast to film images illuminated thereby.

SUMMARY OF THE INVENTION

The invention provides apparatus for illuminating medical diagnostic imaging film, and includes a light source, and reflecting means receiving light from the light source for projecting at least a portion of the received light in the form of a collimated beam directed along an axis. The apparatus further includes means for supporting the light source and the reflecting means in a specified relationship with respect to each another, and for supporting the film in spaced-apart relationship with the reflecting means, so that the collimated beam passes through at least a portion of the film.

In a preferred embodiment of the invention, reflecting means comprises a parabolic or other concave mirror having an associated focal point. The light source, which may comprise one of several forms, is located at the focal point of the mirror. In one embodiment the light source comprises a light pipe having its end positioned at the focal point. In another embodiment, the source may comprise an initial light beam which is directed into the concave mirror from one side thereof.

The supporting means may alternatively comprise structure from a conventional view box or bright light. The invention could further be configured as a view box provided with both a conventional source of view box illumination, as well as means for producing a collimated light beam in accordance with the invention. Such embodiment would include a modified light diffuser, as described hereinafter.

OBJECTS OF THE INVENTION

An object of the invention is to provide apparatus for illuminating radiographic and other medical diagnostic imaging films to improve contrast and resolution.

Another object is to provide both view box and bright light viewing apparatus having improved contrast and resolution.

Another object is to provide a view box which eliminates the need for an additional separate bright light, while providing improved contrast and resolution in viewing a selected portion of a medical diagnostic imaging film.

Another object is to provide a view box with improved contrast and resolution, while substantially maintaining the field of view thereof.

These and other object of the invention will become more readily apparent from the ensuing specification, taken together with the accompanying drawings.

BRIEF DESCRIPTION OF THE DRAWINGS

FIG. 1 is a perspective view showing a prior art view box.

FIG. 2 is a diagram illustrating the effects of scattered light in the transillumination of medical diagnostic imaging film.

FIG. 3 is a side view showing a view box incorporating an embodiment of the invention.

FIG. 4 is a diagram illustrating the embodiment of FIG. 3.

FIG. 6 is a perspective view showing a third embodiment of the invention.

FIG. 7 is a sectional view taken along lines 7—7 of FIG. 6.

DETAILED DESCRIPTION OF THE PREFERRED EMBODIMENT

Figure 5:
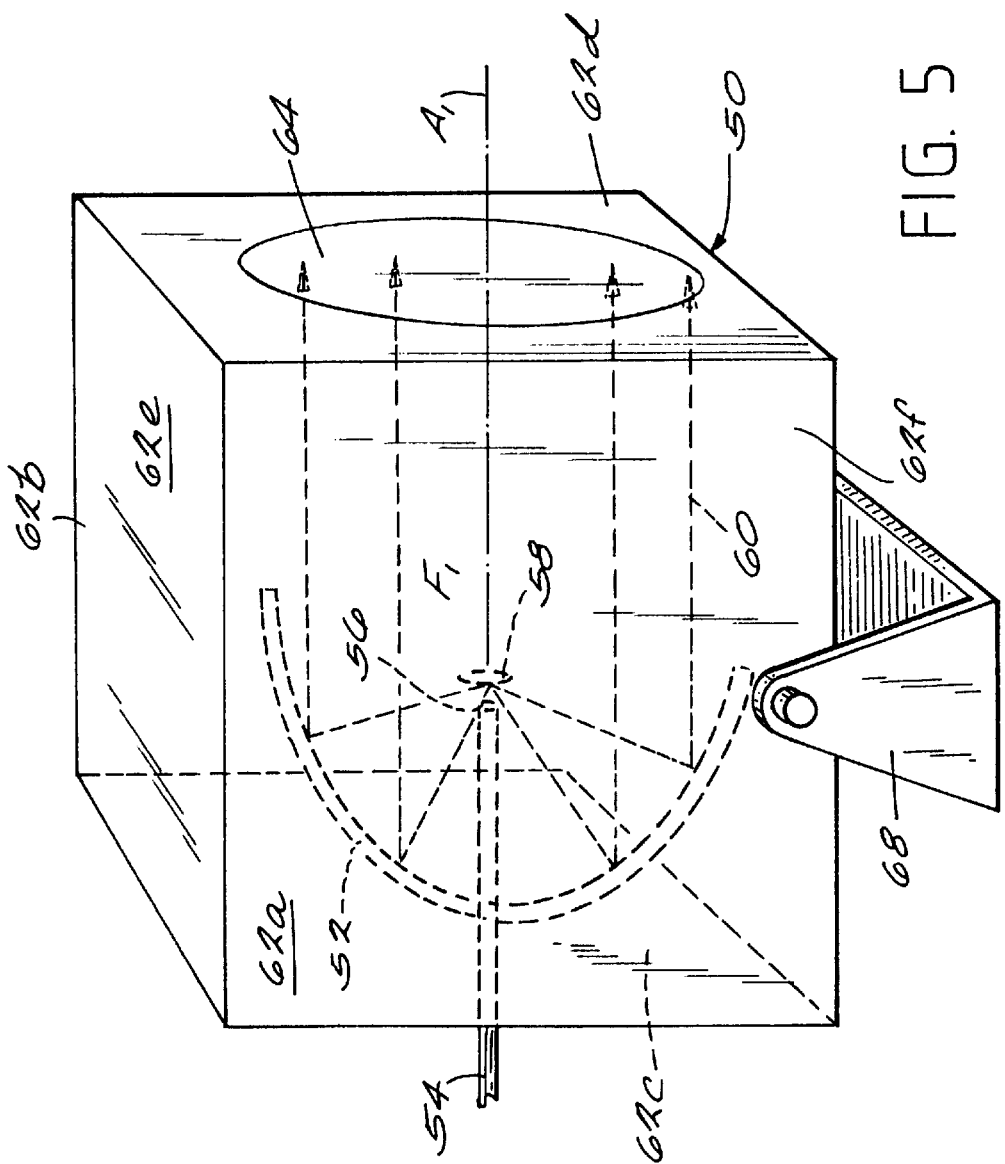
FIG. 5 shows an embodiment of the invention incorporated into a bright light.

Referring to FIG. 1, there is shown a conventional view box 10, generally comprising a rear wall 12, side walls 14, and a diffuser panel 16, which collectively enclose a space. Fluorescent tubes 18 are mounted on the inner surface of rear wall 12, to serve as a light source for the view box 10. Diffuser panel 16 comprises a sheet of translucent, milky white Plexiglas, as described above, so that light from the source can pass through the diffuser panel, and be diffused or scattered thereby. An X-ray or radiographic film 20 is fastened upon diffuser panel 16 by clips or other suitable means (not shown), so that light transmitted through diffuser 16 illuminates an X-ray image 22 imprinted on the film 20. The light carries an image of the X-ray film image 22 to the retina 24 of an observer's eye.

While view box 10 shows only a single film 20 for simplification, view boxes are frequently large enough to mount and illuminate up to four films 20 at the same time, in side-by-side relationship, for comparison purposes. Such arrangement is shown, for example, in FIG. 12 of the drawings.

Referring to FIG. 2, there is shown a portion of X-ray film 20, spaced apart from a portion of diffuser panel 16 for purposes of illustration, although they are actually in abutting relationship as shown in FIG. 1. The portion of diffuser panel 16 receives light from fluorescent tubes 18, to project scattered or diffused light rays 25 toward X-ray film 20. A portion of the X-ray image 22, comprising lighter and darker regions 22a and 22b, respectively, is projected onto the retina 24 by the light rays 25, as lighter and darker images 22c and 22d, respectively corresponding to regions 22a and 22b.

Referring further to FIG. 2, there is shown some of the scattered light rays 25 depicted as rays 25a, passing through film 20 at a boundary or edge 26 between lighter and darker portions 22a and 22b, to project an image 26a of the edge 26 onto the retina 24. However, because of the diffused nature of light rays 25, the image 26a is a blurred representation of the edge 26, not a clear and sharp representation. Thus, resolution between X-ray image portions 22c and 22d is degraded, as stated above. Accordingly, it becomes more difficult to accurately interpret medical information provided by X-ray image 22.

Referring to FIG. 3, there is shown a view box 28, constructed in accordance with the invention. View box 28 generally comprises a rear wall 27 and side walls 29, which may be similar or identical to rear wall 12 and side walls 14 respectively, of view box 10 described above. However, instead of the prior art light source 18, view box 28 is provided with a concave mirror 30, having an associated focal point located at F. Mirror 30 may, for example, comprise a three dimensional parabolic structure having a highly polished layer 32 of silver or other reflective material placed on its inner surface.

Referring further to FIG. 3, there is shown a point light source 34 located at focal point F, to project light rays such as $R_1$ and $R_2$. Projected light rays which are incident on reflective surface 32 of concave mirror 30 are reflected thereby, along paths which are respectively parallel to an axis A, comprising the axis of mirror 32. Thus, incident light rays $R_1$ and $R_2$ are respectively reflected as rays $R_1'$ and $R_2'$. All the reflected rays collectively comprise a collimated light beam 36, i.e., a beam of light rays which are all in substantially parallel relationship with one another, over the useful length of the beam.

Light source 34 usefully comprises an open end of a light pipe 36, such as an optic fiber, which is inserted into mirror 30 through a small aperture 38 at the rear thereof. The opposing end of light pipe 36 is coupled to receive light from a source 40. Light pipe 36 is oriented along the mirror axis A, and a cap 42 is positioned over it with respect to source 34 to prevent light rays thereof from being transmitted directly into view box 40, without reflection from mirror 30.

FIG. 3 further shows a glass, plastic, or other light transparent panel 44 positioned across the end of view box 28 opposite from the mirror 30, that is, the end thereof through which collimated beam 36 is transmitted. The radiographic film 20 is fastened upon transparent panel 44 by clips or other suitable means (not shown) so that collimated light beam 36 illuminates the film. The film 20 lies in a plane which is substantially orthogonal to axis A and collimated beam 36. Also, mirror 30 is sized so that the cross section of beam 36 is equal to or greater than the area of film 20. Thus, each portion of film 20 and the image 22 thereon is illuminated by parallel light rays of beam 36. It is to be appreciated that the diffuser panels of prior art view boxes are eliminated from the view box 28, to prevent divergence or diffusion of any of the light in collimated beam 36.

Referring to FIG. 4, there is shown a portion of film 20 illuminated by rays of beam 36. The rays project the regions 22a and 22b of film image 22 onto the retina 24 as respectively corresponding images 46a and 46b. Some of such rays are collectively represented in FIG. 4 as ray 36a, which pass through the edge 26 of film 20 to project an image 48 thereof onto retina 24. Since the rays of collimated beam 36 are substantially parallel to one another, and intersect the plane of film 20 at the same angle, the image 48 of edge 30 is sharp and unblurred, as received on the retina. An observer is thereby able to much more clearly distinguish between light and dark regions 22a and 22b, indicating significant improvement in resolution and contrast.

Referring to FIG. 5, there is shown a bright light 50, which has been modified in accordance with the invention. More particularly, the incandescent light bulb generally used for the light source in prior art bright lights has been removed, and has been replaced by a concave mirror 52. Mirror 52 usefully comprises a parabolic mirror or the like similar to mirror 30 of FIG. 3, except that it is of selectively smaller size. A light pipe 54, similar to light pipe 36, is passed through mirror 52, and an open end of the light pipe is located at the focal point $F_1$ of mirror 52, to provide a point light source 56. Accordingly, mirror 52 operates to reflect light from source 56, as described above in connection with FIG. 3, to provide a collimated light beam 60. A cap 58 is positioned relative to light source 56 to prevent transmission of light directly from the light source, i.e., without reflection from the mirror 52.

As shown by FIG. 5, bright light 50 generally comprises side walls 62a and b, end walls 62c and d, and top and bottom walls 62e and f, respectively. The walls collectively form an enclosure for mirror 52. A circular aperture 64, having a diameter which is usefully on the order of four inches, is formed through the end wall 62d. Thus, a collimated light beam 60, comprising rays which are generally parallel to the axis $A_1$ of mirror 52 and orthogonal to end wall 62d, pass outward from bright light 50 through aperture 64.

As stated above, radiologists frequently encounter unclear areas or regions in viewing film images on view boxes. When this occurs, the film 20 is removed from the view box, and is held by hand in the path of bright light beam 60, to provide greater illumination for closer film study. The film is oriented so that beam 60 will illuminate a selected portion of the film. As with light provided by view box 28, the parallel light of collimated beam 60 significantly improves resolution and contrast in viewing an image. FIG. 5 further shows bright light 50 supported on a stand 68.

Referring to FIG. 6, there is shown a viewing arrangement 70, which comprises a rear wall 27 and side walls 29 in like manner with view box 28, described above in connection with FIG. 3. Arrangement 70 is further provided with a configuration of fluorescent tubes 72 proximate to rear wall 27. However, viewing arrangement 70 also includes a concave mirror 74 proximate to rear wall 27, mirror 74 being similar or identical to mirror 52 described above in connection with FIG. 5. Also, a point light source 76, such as source 34 described above, is positioned at the focal point of mirror 74. Thus, mirror 74 projects a collimated light beam 78 toward the opposite end of arrangement 70, which is closed by a light transparent panel 80. Usefully, the dimensions of panel 80 are on the order of 17 inches by 14 inches, the standard size of a film 20, or on the order of 17 inches by 56 inches, to accommodate four films 20 at once (not shown in FIG. 6). On the other hand, mirror 74 is sized to provide a collimated beam having a diameter on the order of four inches. Mirror 74 is mounted within the enclosure formed by rear wall 27 and side walls 29, by means of brackets or the like (not shown), so that collimated beam 78 is directed to pass through a selected region of panel 80. For example, FIG. 6 shows beam 78 passing through the upper right hand corner of panel 80, and in orthogonal relationship therewith. For reasons described hereinafter, it is useful to mark the boundary 82 of the region of panel 80 traversed by beam 78, such as by paint or by etching the surface of panel 80.

FIG. 6 further shows a diffuser panel 84 positioned in abutting relationship with transparent panel 80, on the side thereof facing toward the fluorescent tubes 72 and mirror 74. Diffuser panel 84 comprises a sheet of milky white Plexiglas or the like, in like manner with diffuser panel 16, described above. However, as best shown in FIG. 7, diffuser panel 84 is provided with a notch 84a, or is otherwise formed, so that no portion thereof intersects collimated beam 78. Accordingly, no portion of the light of beam 78 is diffused or diverged by panel 84.

Referring further to FIG. 6, there is shown radiological film 20 supported in abutting relationship with transparent panel 80 by means of a holding mechanism 86, which includes a bar 88. A linear track 90 is attached to bar 88, and the bar and track are supported in a generally horizontal orientation, as described hereinafter. Clips 92 are designed to engage film 20, on opposing sides thereof, and also to easily slide along the track 90. Thus, clips 92 and track 90 allow one using viewing arrangement 70 to readily displace film 20 horizontally.

FIG. 6 shows holding mechanism 86 further including a bracket 94, fixably joined to viewing apparatus 70 by means of a plate 96, and supporting a vertically oriented sleeve 98. A rod 100, fixably joined to bar 88 by means of a plate 102, is inserted into sleeve 98 and adjustably held therein by means of a screw 104 or the like. The bar 88 is thereby maintained in a horizontal orientation, and the bar and film 20 may be thereby readily displaced vertically. It is to be understood that the dimensions of respective components of holding device 86 are selected to allow sufficient horizontal and vertical travel for film 20 to enable any portion of image 22, such as portion 22c shown in FIG. 6, to be positioned to intersect the collimated light beam 78.

FIG. 6 is intended to have two modes of operation, as determined by operation of an electrical switch 106, connected to both fluorescent tubes 72 and point light source 76. In a first mode, the fluorescent tubes are turned on while the point light source is turned off. In such mode, film 20 is positioned to overlay panel 80, so that all parts of image 22 are illuminated by light from tubes 72. In such mode viewing arrangement 70 functions substantially as a conventional view box, to allow an image on film 20 to be generally studied.

In the event one using viewing arrangement 70 determines that a portion 22c is of particular importance and must be more closely studied, he can quickly reposition the film by means of holding device 86, so that image portion 22c overlays the region of panel 80 lying within boundary 82. Switch 106 is operated to turn off fluorescent tubes 72 and to turn on point light source 76. The viewing arrangement is thereby placed in its second mode of operation, and the light beam 78 is projected to illuminate the selected portion of image 22 with substantially parallel light. As stated above, the contrast and resolution of the selected image portion is thereby significantly enhanced. Moreover, use of viewing arrangement 70 eliminates the need for a separate bright light device, and can significantly simplify the film handling required to reposition film 20 for special viewing of an image portion 22c.

It is to be understood that switch 106 may be either foot or hand operated. It is to be emphasized that holding device 86, described above, is intended to be illustrative of a device for enabling film 20 to be readily moved in two dimensions, while remaining in close abutting relationship with transparent panel 80. A number of other designs for devices to perform such function, which are considered to be within the scope of the invention, will readily occur to those of skill in the art.

Figure 8:
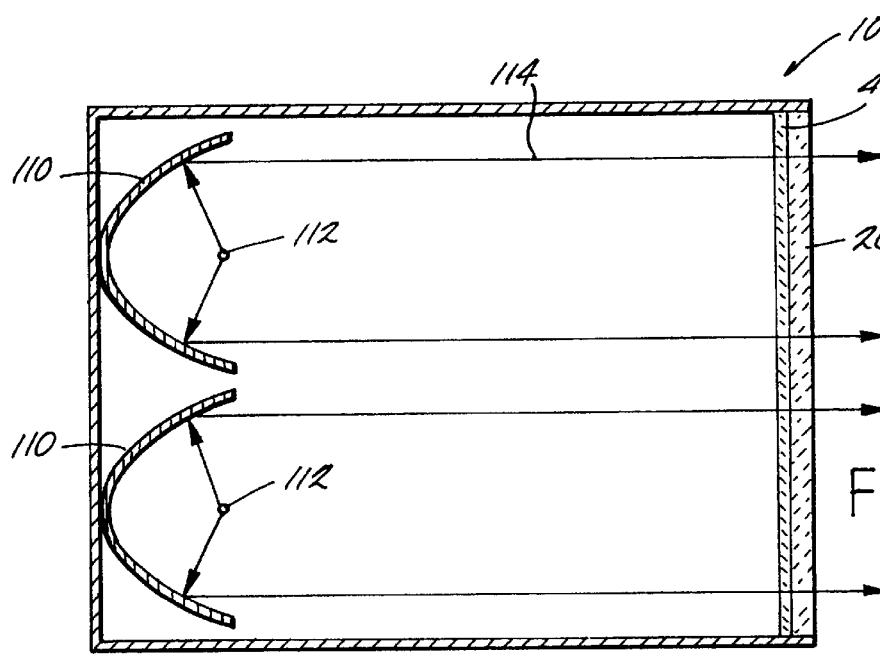
FIG. 8 is a side view showing a modification of the embodiment shown in FIG. 3 of reflective mirrors.

Referring to FIG. 8, there is shown a view box 108 which is very similar to view box 28, described above in connection with FIG. 3. However, the single concave mirror of view box 28 has been replaced by a plurality of concave mirrors 1 10, each having a point light source 112 and projecting a collimated light beam 114. Light rays of the projected beams 114 are substantially parallel to one another and orthogonal to transparent panel 44. It is anticipated that an array of smaller mirrors 110 can provide substantially the same parallel ray illumination which is available from a larger single mirror. At the same time, use of smaller mirrors may provide certain design flexibility or cost advantages in some applications.

Figure 9:
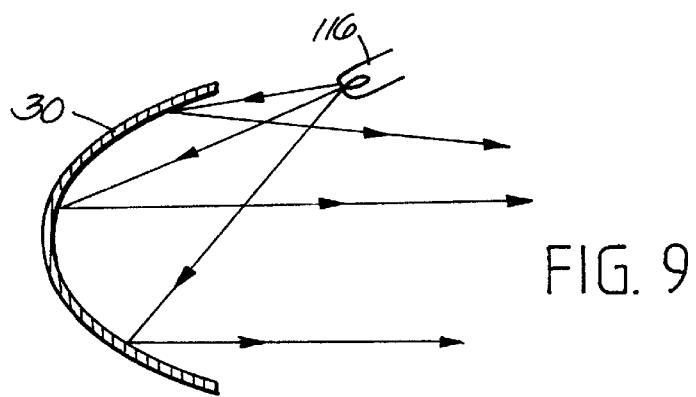
FIGS. 9 and 10 respectively show further modifications of the embodiment shown in FIG. 3.

Referring to FIG. 9, there is shown mirror 30 receiving light from a point light source 116, rather than a source 34. Source 116, which may comprise an electrical filament, is located to the side of mirror 30 and is positioned to direct light into the interior thereof.

Figure 10:
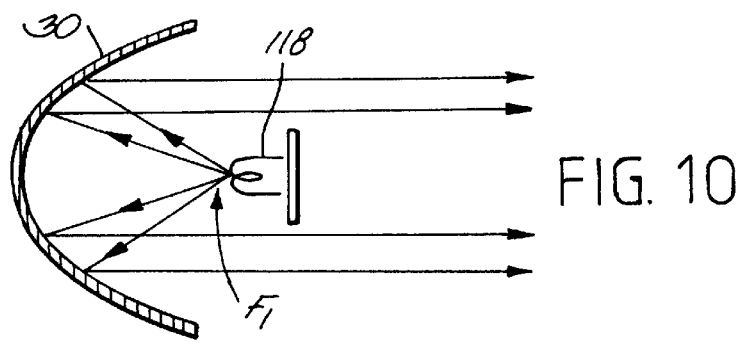

Referring to FIG. 10, there is shown a mirror 30 receiving light from a point light source 118, rather than a source 34. Light source 118 comprises an electrical light filament located at the focal point $F_1$ of mirror 30.

Figure 11:
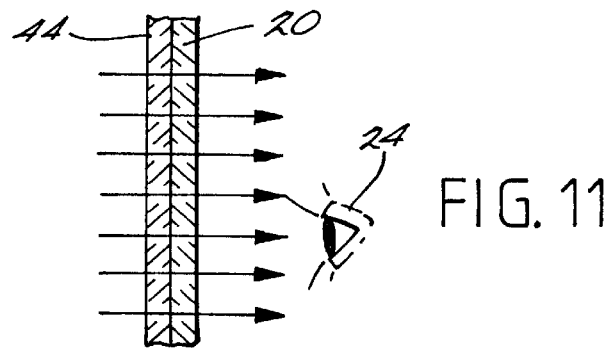
FIG. 11 is a view illustrating reduced field of view.

As stated above, the flat front panel of a conventional view box may be made large enough to simultaneously accommodate four 14 inch by 17 inch diagnostic films placed in side-by-side relationship. This arrangement allows the radiologist to readily compare information provided by different films, such as films showing the same view of a patient at different times. Because of light diffusion in a conventional view box, the radiologist's field of view extends to the entire panel. Thus, he can view all four films at the same time, with comparatively little head or body movement. However, if highly collimated light is employed to illuminate film 20 on a view box panel 44, only light transmitted through a comparatively small region of the panel, and the film thereon, will be received by the retina 24 of the radiologist or other viewer, while the retina is fixed at a specified position. This is illustrated, for example, by FIG. 11. Thus, use of collimated light can substantially diminish field of view. In the embodiments described above in connection with FIGS. 5 and 6, respectively, reduction in field of view may be of little concern, since the collimated light is projected through only a small region of the film 20 by design. However, with a conventional view box, and particularly a view box for displaying multiple films, significant reduction in field of view could force a viewer to continually move his upper body, in order to view all the films on the front panel in their entirety. This, in turn, may cause fatigue and muscle stiffness, particularly if viewing of diagnostic film continues over a prolonged period of time.

Figure 12:
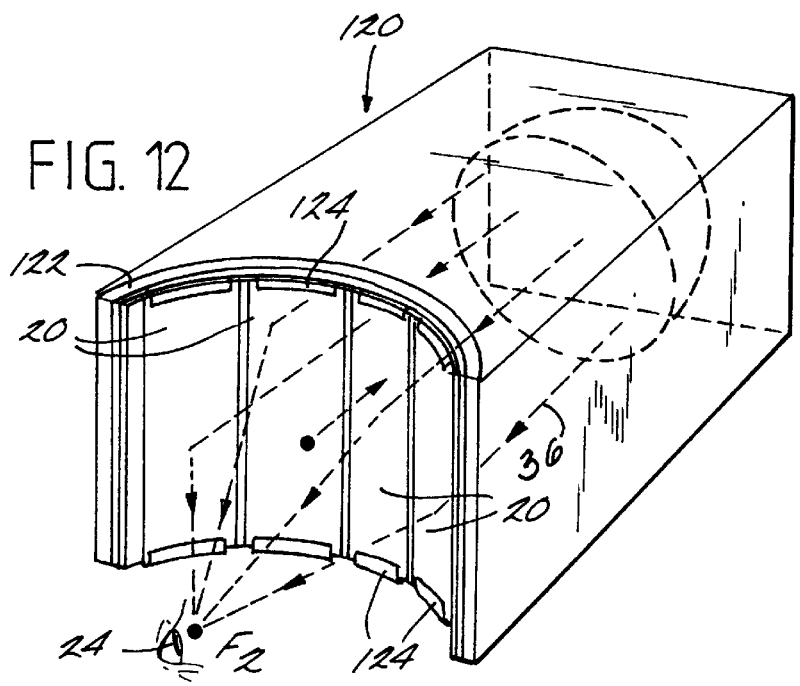
FIGS. 12 and 13 show respective embodiments of the invention for maintaining field of view.

Referring to FIG. 12, there is shown a view box 120, wherein the front panel 122 is curved, rather than planar as shown by the prior art. There are further shown four films 20 mounted on panel 122. Because of the flexibility of the film 20, the films can be positioned in abutting relationship with the curved surface of panel 122, such as by means of clips 124 which follow the contour of panel 122. If a collimated light beam 36 is projected through such panel and films, as described above in connection with FIG. 3, the panel 122 will operate to focus the light 36 to focal point $F_2$. Thus, the light passing through each portion of films 20 carries an image thereof to the focal point $F_2$. Accordingly, if a viewer places the retina 24 of his eye at $F_2$, his field of view will include substantially all portions of all films 20 positioned along the curved panel, 122. At the same time, the collimated light will provide improved resolution and contrast for the viewed images, as described above. Thus, the curved front panel 122 serves to preserve field of view.

It is anticipated that in one embodiment the curved screen 122 lies along a section of a hypothetical circle having a radius on the order of three feet. While FIG. 12 is positioned along a circular section lying in a horizontal plane, such screen could alternately be configured along a section of a hypothetical circle lying in a vertical or other plane.

Figure 13:
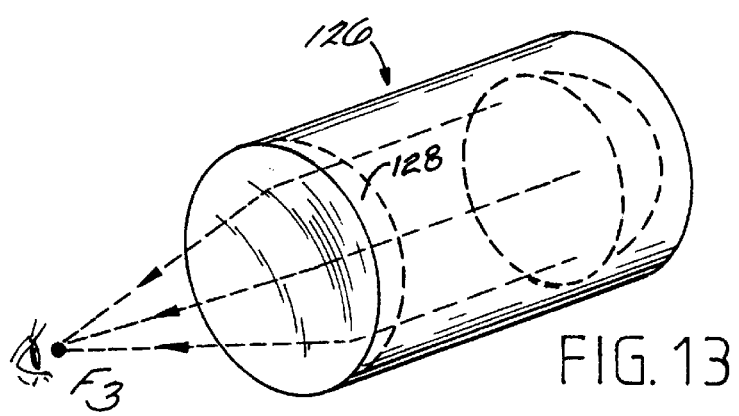

In an alternative embodiment, shown in FIG. 13, a view box 126 has a curved panel 128 for focusing collimated light passing therethrough to a focal point $F_3$. Curved panel 128 lies on a section of a hypothetical sphere.

Obviously, many other modifications and variations of the present invention are possible in light of the above teachings. It is therefore to be understood that within the scope of the disclosed concept, the invention may be practiced otherwise than as specifically described.

What is claimed is:

1. Apparatus for supporting and illuminating a selected number of medical diagnostic imaging films comprising:

a selectively curved light transmissive film support panel;

means for holding said imaging film in abutting conformable relationship with a specified surface of said film support panel;

a light source located in spaced apart relationship with said film support panel;

selected structure disposed to receive light from said light source and to project at least a portion of said received light, in the form of a collimated light beam, through said film support panel and through substantially all portions of said imaging film; and said film support panel is selectively configured to focus said collimated light to a specified viewing position.

2. The apparatus of claim 1 wherein:

said film support panel lies along a section of a hypothetical circle of selected radius.

3. The apparatus of claim 2 wherein:

said film support panel has a concave surface and a convex surface;

said holding means comprises means for holding said imaging film in abutting conformable relationship with said concave surface of said film support panel; and said viewing position is located nearer to said concave surface of said film support panel than to said convex surface thereof.

4. The apparatus of claim 1 wherein:

said holding means comprises means for holding a plurality of said imaging films in conformable relationship with said film support panel.

5. The apparatus of claim 1 wherein:

said apparatus includes an enclosure having first and second ends in opposing relationship with one another;

said light source is located proximate to said first end; and said film support panel is positioned across said second end of said enclosure in the path of said collimated light beam.

6. Illuminating apparatus comprising:

a selected number of medical diagnostic imaging films;

a selectively curved light transmissive film support panel;

means for holding said imaging films in abutting conformable relationship with a specified surface of s aid film support panel;

a light source located in spaced apart relationship with said film support panel;

means receiving light from said light source for projecting at least a portion of said received light, in the form of a collimated light beam, through said film support panel and through substantially all portions of said imaging films; and said film support panel is selectively configured to focus said collimated light to a viewing position located at a specified point.

7. The apparatus of claim 6 wherein:

said film support panel lies along a section of a hypothetical circle of selected radius.

8. The apparatus of claim 6 wherein:

said holding means comprises means for simultaneously holding each of a plurality of said imaging films in conformable relationship with said film support panel.

* * * * *